United States Patent Office 2,805,227
Patented Sept. 3, 1957

2,805,227

SUBSTITUTED NITROSOPYRROLES AND METHOD OF PREPARING THE SAME

Donna Bernice Cosulich, Plainfield, N. J., assignor to American Cyanamid Company, New York, N. Y., a corporation of Maine No Drawing. Application January 18, 1956,
Serial No. 559,775

6 Claims. (Cl. 260—326.3)

This invention relates to substituted alkylnitrosopyrrolecarboxylates and method of preparing the same.

In the past nitrosopyrroles have been described; however, they are relatively rare and none have been described as having fungicidal activity.

It has been found that nitrosopyrroles having the following structure highly active as fungicides:

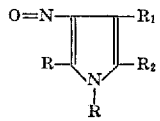

in which R is a lower alkyl radical and $R_1$ and $R_2$ are members of the group consisting of lower alkyl and carbloweralkoxy radicals, one of which is a lower alkyl radical and the other a carbloweralkoxy radical. The R groups may be different.

The compounds of the present invention are light green to white crystalline solids. They are somewhat soluble in alcohol or chloroform and relatively insoluble in water.

The present compounds are prepared by reacting the appropriate substituted pyrrole having a free hydrogen in the 4-position with nitrous acid which may be formed in situ by the use of an alkali metal nitrite under aqueous acid condition. This reaction is generally carried out at a temperature of from 0° to 30° C. Following completion of the reaction, the desired product is isolated from the reaction mixture by dilution with an ice-water mixture. If desired purification is accomplished by crystallization from a suitable solvent such as alcohol, acetone, etc.

The starting materials for the process of the present invention can be methyl, ethyl, propyl or butyl 1,3,5-trimethyl-2-pyrrolecarboxylate; methyl, ethyl, propyl or butyl 3,5-dimethyl-1-lower alkyl-2-pyrrolecarboxylate; methyl, ethyl, propyl or butyl 1,2,5-trimethyl-3-pyrrolecarboxylate and the like.

The compounds of the present invention are active against a number of fungi as shown in the following table:

The present compounds can be used as fungicides in solution. They can also be mixed with solid carriers such as talc, kieselguhr, chalk, diatomaceous earth and the like and used as a dusting powder. When using these compounds in solution, it may be desirable to also use surface-active agents such as salts of alkyl and alkylaryl sulfonates, alkyl sulfates, fatty acid ester of polyhydric alcohols such as Span, the ethylene oxide addition products of such as esters, as, for example, Tween.

The following examples illustrate the preparation of compounds of the present invention:

EXAMPLE 1

To a solution of 1114 parts by volume of concentrated sulfuric acid and 476 parts by volume of water, cooled to 5–10° C. is added 154.3 parts by weight of ethyl 1,3,5-trimethyl-2-pyrrolecarboxylate. After allowing to stir one hour to complete solution, at 5–10° C. is added gradually a solution of 70.3 parts by weight of sodium nitrite in 132 parts by volume of water. The temperature is maintained at 5–10° C. and the addition requires 30 to 40 minutes. The reaction mixture after an additional hour at 10° C. is poured on 6,350 parts by volume of an ice-water mixture. The precipitated product is filtered and washed with water. The crude product, which weighs 118 parts, is dissolved by warming to 50° C. in 1950 parts by volume of alcohol. Addition of 2500 parts by volume of water causes the pure material to separate as green crystals which, when isolated by filtration and dried, weigh 105.4 parts by weight. The product is ethyl 1,3,5-trimethyl-4-nitrose-2-pyrrolecarboxylate, melting at 87.8–88.7° C.

EXAMPLE 2

150 parts of diethyl 3,5-dimethyl-2,4-pyrroledicarboxylate, 2250 parts by volume of dry toluene and 21.8 parts of sodium are heated to 80–85° C. in the presence of 6 parts by volume of ethanol for 4½ hours. Addition of 94.6 parts by volume of diethyl sulfate is carried out. The mixture is heated for eleven hours. The insolubles are filtered out and the filtrate is freed of toluene by distillation and steam stripping. The oil-in-water mixture solidified and the solid isolated is recrystallized several times from dilute alcohol to give 65 parts of 1-ethyl-3,5-dimethyl-2,4-pyrroledicarboxylate, melting point 38.5–40.5–41.3° C.

64 parts of diethyl 1-ethyl-3,5-dimethyl-2,4-pyrroledicarboxylate is dissolved in 216.5 parts by volume of concentrated sulfuric acid while maintaining the temperature at 30° C. After allowing to stand at 30° C. for one hour more, the solution is poured in 1500 parts by volume of ice and water. The solid, which is filtered and washed with water, is slurried in 1080 parts by vol-

TABLE

*Antifungal activity*

[Minimal inhibitory concentrations in mg. per ml.]

| Compound | C. a. | S. c. | M. r. | F. e. | H. c. | T. m. |
|---|---|---|---|---|---|---|
| Ethyl 1,2,5-trimethyl-4-nitroso-3-pyrrolecarboxylate | 0.06 | 0.06 | 0.58 / 71.0 | 0.25 | 0.03p / 0.12 | 0.06 |
| Ethyl 1,3,5-trimethyl-4-nitroso-2-pyrrolecarboxylate | 0.008 | 0.015 | 0.015 | 0.03 | 0.004p / 0.015 | 0.06 |
| Ethyl 3,5-dimethyl-1-ethyl-4-nitroso-2-pyrrolecarboxylate | 0.06 | 0.015 | 0.03 | 0.12 | 0.12 | 0.25 |

C. a.—*Candida albicans*.
S. c.—*Saccharomyces carlsbergensis*.
M. r.—*Mucor ramannianus*.
F. e.—*Fusarium epispharia*.
H. c.—*Hormodendrum cladosporoides*.
T. m.—*Trichophyton mentagrophytes*.

ume of water and 108 parts by volume of 5 N sodium hydroxide. After stirring for some time, a little unreacted material is filtered out and the clear solution is acidified. The precipitate is isolated and weighs 45.5 parts, melting at 158–159.3° C. (dec.), and analyzed for 5-carbethoxy-1-ethyl-2,4-dimethyl-3-pyrrolecarboxylic acid.

45 parts of 5-carbethoxy-1-ethyl-2,4-dimethyl-3-pyrrolecarboxylic acid is heated in 108 parts by volume of dry glycerine at 190–200° C. for two hours. The cool solution is extracted with ether, water added and extracted thrice more with ether. The combined ether layers are washed with water, desiccated, and freed of ether by distillation. The residue distills at 73.5–77° C. at 0.45 mm. to give 28.5 parts of ethyl-1-ethyl-3,5-dimethyl-2-pyrrolecarboxylate.

In a solution of 11.14 parts by volume of concentrated sulfuric acid and 4.8 parts by volume of water is dissolved at 5–8° C. 14.25 parts of ethyl-1-ethyl-3,5-dimethyl-2-pyrrolecarboxylate. To this solution at 5–10° C. is added gradually 1.53 parts of sodium nitrite in 9 parts by volume of water. After standing 20 minutes, the solution is poured over 480 parts by volume of ice and water. The green oil is extracted out thrice with ether and desiccated. Removal of the ether under reduced pressure gives a dark emerald-green oil which crystallizes beautifully below 5° C. as ethyl-1-ethyl-3,5-dimethyl-4-nitroso-2-pyrrolecarboxylate.

EXAMPLE 3

Ethyl 1,2,5-trimethyl-3-pyrrolecarboxylate (22 parts) was dissolved in a mixture of glacial acetic acid (300 parts) and water (100 parts) and cooled to —5° C. Sodium nitrite (10 parts) was dissolved in water (50 parts) and cooled at 0° C. The solutions were combined and held at 4° C. for one hour. Pouring into 2000 parts of ice water gave a precipitate of ethyl 1,2,5-trimethyl-4-nitroso-3-pyrrolecarboxylate, which was collected and dried. It was purified by solution in 200 parts of acetone and subsequent reprecipitation by 4000 parts of water. The yield of purified product, ethyl 1,2,5-trimethyl-4-nitroso-3-pyrrolecarboxylate, was 8 parts, decomposing at 109°–110° C.

I claim:

1. A compound of the group having the general formula:

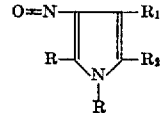

in which R is a lower alkyl radical and $R_1$ and $R_2$ are members of the group consisting of lower alkyl and carbloweralkoxy radicals, one of which is lower alkyl and the other a carbloweralkoxy radical.

2. Ethyl 1,3,5-trimethyl-4-nitroso-2-pyrrolecarboxylate.
3. Ethyl-1-ethyl-3,5-dimethyl-4-nitroso-2-pyrrolecarboxylate.
4. Ethyl 1,2,5-trimethyl-4-nitroso-3-pyrrolecarboxylate.
5. A lower alkyl ester of 1,3,5-triloweralkyl-4-nitroso-2-pyrrole carboxylic acid.
6. A lower alkyl ester of 1,2,5-triloweralkyl-4-nitroso-3-pyrrole carboxylic acid.

References Cited in the file of this patent

UNITED STATES PATENTS

| 2,382,916 | Rogers | Aug. 14, 1945 |
| 2,410,604 | Goodings et al. | Nov. 5, 1946 |

OTHER REFERENCES

Angeli et al.: Beilstein (Handbuch, 4th ed.), vol. 21, p. 273 (1935).

U. S. DEPARTMENT OF COMMERCE
PATENT OFFICE

CERTIFICATE OF CORRECTION

Patent No. 2,805,227     Donna Bernice Cosulich     September 3, 1957

It is hereby certified that error appears in the printed specification of the above numbered patent requiring correction and that the said Letters Patent should read as corrected below.

Column 2, line 27, for "in 1950" read -- in 1590 --; line 31, for "-nitrose-" read -- -nitroso- --.

Signed and sealed this 10th day of June 1958.

(SEAL)
Attest:

KARL H. AXLINE
Attesting Officer

ROBERT C. WATSON
Commissioner of Patents